3,573,248
LACQUER MIXTURES
Josef Pedain, Cologne-Buccheim, Richard Müller, Bergisch-Neukirchen, Frank Wingler, Leverkusen, and Walter Krauss, Leverkusen-Steinbuchel, Germany, assignors to Farbenfabriken Bayer Aktiengesellschaft, Leverkusen, Germany
No Drawing. Filed July 9, 1969, Ser. No. 840,463
Claims priority, application Germany, July 10, 1968, P 17 69 763.1
Int. Cl. C08g 22/00, 37/32
U.S. Cl. 260—31.7                                     6 Claims

ABSTRACT OF THE DISCLOSURE

Lacquer mixtures containing at least one hydroxyl free polyacrylate resin having carbonamide groups and a molecular weight above 600 and at least one poly-N-alkoxymethylurethane cross-linking agent.

---

It has already been disclosed in German Auslegeschrift 1,244,410 that synthetic resins which are capable of being cross-linked can be produced by reacting, inter alia, polymerization products having a molecular weight above 600 and at least two active hydrogen atoms as determined by the Zerewitinoff method, with an alkoxymethyl isocyanate. Cross-linkable lacquers, for example, can be obtained by this method. Although the process described in Auslegeschrift 1,244,410 has important advantages over other known processes, it does not meet every requirement for the production of lacquers satisfactorily.

For example, this method cannot be used for production of a carbonamide-containing acrylate lacquer binder since such materials are normally prepared in butanol or some other solvent which is reactive with isocyanates. Consequently, when the cross-linkable resin is produced in the manner indicated above, the alkoxymethyl isocyanate reacts simultaneously with the solvent. Furthermore, the reaction product of such a material with an alkoxymethyl isocyanate does not have the required properties, e.g. the required elasticity, to make it suitable as a lacquer binder.

It is also known that acrylate lacquer binders containing carbonamide groups can be hardened and cross-linked with the usual commercial melamine-formaldehyde resins or converted into the cross-linkable state by reaction with formaldehyde. However, neither process yields a product having the required properties, e.g. the required elasticity, since both processes result in lacquer coatings of low elasticity. Moreover, the presence of incompletely reacted formaldehyde in the last mentioned process results in an unpleasant odor which is very disadvantageous.

This invention provides lacquer mixtures containing at least one hydroxyl free polyacrylate resin having carbonamide groups and a molecular weight greater than about 600 and at least one poly-N-alkoxymethylurethane. If desired, the lacquer mixtures of this invention may also contain at least one melamine/formaldehyde resin and/or urea/formaldehyde resin and any of the usual lacquer additives, acid catalysts, solvents and the like. When the poly-N-alkoxymethylurethanes of this invention are used as cross-linking agents for polyacrylate resins, either with or without melamine/formaldehyde or urea/formaldehyde resins, it is possible to prepare lacquer coatings which have a very high solvent resistance from acrylate resins which do not contain hydroxyl groups but only carbonamide groups.

The main advantage of the lacquer mixtures of this invention lies in the many possible variations which may be made in their composition. By using any of the different and readily obtainable poly-N-alkoxymethylurethanes in different modifications and varying proportions, a wide range of lacquer binders can be produced with the polyacrylate resins of this invention. Furthermore, the properties of such binders (e.g. hardness, elasticity, resistance to chemicals and stoving temperature) can be varied to suit requirements. As a matter of fact, the poly-N- alkoxymethylurethanes of this invention can be added to even very hard, brittle polyacrylate resins to yield cross-linked, elastic lacquer films. A particular advantage of poly-N-alkoxymethylurethanes in this connection is their excellent compatibility with acrylate lacquer binders and the fact that they even have the effect of imparting compatibility. Consequently, polyacrylates which are generally not readily compatible can now be hardened with melamine resins, alkyd resins or other lacquer components which are generally not able to combine with them to form clear, high-gloss films when the poly-N-alkoxymethylurethanes of this invention are employed.

About 100 parts by weight of the lacquer mixtures of this invention generally contain from about 15 to about 50 parts by weight of a carbonamide-containing polyacrylate resin, about 5 to about 40 parts by weight of one or more poly-N-alkoxymethylurethanes, up to 70% of which may be replaced by one or more melamine- and/or urea/formaldehyde resins, and about 20 to about 80 parts by weight of one or more solvents. In addition, the lacquer mixture may contain the usual lacquer additives such as plasticizers, alkyd resins, pigments, levelling agents, acid catalysts and fillers.

The carbonamide-containing polyacrylate resins used in production of the lacquer mixture of this invention are known per se. They are copolymers prepared by known polymerization processes from acrylic and methacrylic derivatives such as acrylonitrile and methacrylonitrile, acrylates and methacrylates such as ethyl acrylate, methyl methacrylate or methyl acrylate, and higher alkyl esters of acrylic and methacrylic acid, for example containing 2 to 12 carbon atoms in the alkyl ester group. Unsaturated ethers such as ethers of allyl alcohol, unsaturated esters such as vinyl acetate, vinyl propionate and maleic acid esters and aromatic vinyl compounds such as styrene and vinyl toluene may be used as additional components in the production of these copolymers. The required carbonamide groups are introduced by copolymerization with acrylamide and/or methacrylamide. After the polymerization, the carbonamide groups may be partly reacted with formaldehyde and then etherified. Hydroxyl-containing monomers are not used. It may be advantageous, if desired, to impart particular effects such as water solubility to the lacquer mixture or better bonding of the lacquer coatings to their support, to incoporate a certain proportion of acrylic acid and/or methacrylic acid and/or maleic acid semiesters by copolymerization. Their use does not effect the reactivity of the polyacrylates with poly-N-alkoxymethylurethanes to any material extent. Acrylamido methylol ethers and/or methacrylamido methylol ethers may be incorporated as reactive components by polymerization.

Within the context of the invention, the term poly-N-alkoxymethylurethanes is meant to include reaction products of all N-alkoxymethylurethanes of low molecular weight and high molecular weight polyalcohols, the preparation of which is already known. The former compounds may be obtained by condensation of the corresponding urethanes with formaldehyde and monohydric alcohols, although it is preferred to use the reaction products of polyhydroxyl compounds and isocyanates having the formula RO—CH$_2$—NCO, wherein R is an alkyl or alkenyl radical, preferably having 1 to 12 carbon atoms, which reaction products are obtainable by known processes.

Preferred poly-N-alkoxymethylurethanes are those having a molecular weight above 600 and containing at least 3 alkoxymethyl-urethane groups, preferably at least 4 alkoxymethyl-urethane groups.

Examples of N-alkoxymethyl isocyanates which may be used are methoxymethyl isocyanate, ethoxymethyl isocyanate, isopropoxymethyl isocyanate, butoxy-, pentoxy- and hexyloxymethyl isocyanates, allyloxy-methyl isocyanate, decyloxymethyl isocyanate, dodecyloxymethyl isocyanate and the like and mixtures thereof. Methoxymethyl isocyanate is preferred.

Any polyhydroxyl compound may be reacted with the isocyanates including, for example, those suggested in U.S. Pat. 3,201,372, and they may in addition contain ether, thioether, carboxyl, carbonic ester, carbonate, carbonamide, sulphonamide, tert. amino, urethane and urea and the like groups in the molecule. Some such suitable compounds include ethylene glycol, 1,2- and 1,3-propanediol, 1,3- and 1,4-butanediol, 1,6-hexanediol, 2,2-dimethylpropanediol, trimethylol propane, glycerol, sorbitol, mannitol and the like; ether alcohols such as di- and tri-, tetra- or octaethylene and -propylene glycol, thiodiglycol, hydroquinone-di-b-hydroxyethylether and the like and mixtures thereof.

One may also use monoacetyl glycerol, dihydroxyethyl maleate, dihydroxyethyl phthalate, dihydroxyhexyl adipate, dihydroxyethylamine acetic acid, di(N-methyl-N-b-hydroxy)-ethylamide phthalic acid, the tetrahydroxyethylamide of adipic acid, the dihydroxyethylamide of methane sulphonic acid, N-methyldiethanolamine, triethanolamine, bis-(2-hydroxyethyl)-oleylamine and the like and mixtures thereof.

The reaction products of the polyhydroxyl compounds and alkoxymethylisocyanates have a high degree of purity due to the method by which they are prepared and therefore have an especially advantageous effect on the properties of the lacquer mixtures.

Reaction products of high molecular weight polyhydroxyl compounds, e.g. with a molecular weight above about 600, and alkoxymethylisocyanates may also be used as cross-linking agents in the present invention. They are preferably used in cases where it is desired to produce, in particular, elastic lacquer films.

The preparation of these reaction products is described in some detail in German Auslegeschrift 1,244,410. Any high molecular weight polyhydroxyl compounds may be employed; examples of some such suitable components for reaction with the alkoxymethylisocyanates include hydroxyl-containing polyesters prepared from polycarboxylic acids such as phthalic acid, isophthalic acid, adipic acid, maleic acid and the like polyhydric alcohols such as ethane diol, hexane-1,6-diol, glycerol, trimethylol propane and so on; hydroxyl-containing polycarbonates which are obtained from aryl carbonates such as, for example, diphenyl carbonate, or by reacting phosgene with polyalcohols such as hexane-1,6-diol, diethylene glycol, 2,2-bis-[4-(2-hydroxyethoxy)phenyl]-propane, trimethylol propane, pentaerythritol and the like. The preparation of certain such novel polycarbonates is described in the examples. One may also use, in addition hydroxyl-containing polyurethanes obtained from polyalcohols and polyisocyanates; hydroxyl-containing polyethers obtained from polyalcohols such as ethanediol, trimethylol propane and the like and alkylene oxides such as ethylene oxide, propylene oxide, styrene oxide and the like; hydroxyl-containing polyester amides obtained from polycarboxylic acids, polyalcohols and amines or amino alcohols and so on.

The preparation of the reaction products of polyhydroxyl compounds and alkoxymethyl isocyanates may be carried out in bulk, in solution or in emulsion. If the process is carried out in solution, it is advantageous to use the usual solvents which are inert to isocyanates such as xylene, petroleum hydrocarbons, methylethyl ketone, butyl acetate, b-ethoxyethyl acetate and the like and mixtures thereof. A further modification of these products may take place after the reaction with alkoxymethyl isocyanates; for example, any free hydroxyl groups may be reacted with diisocyanates such as hexamethylene diisocyanate and the like.

The following are formulae of preferred reaction products of a polyhydroxyl compound and an alkoxymethylisocyanate which may be used in the present invention:

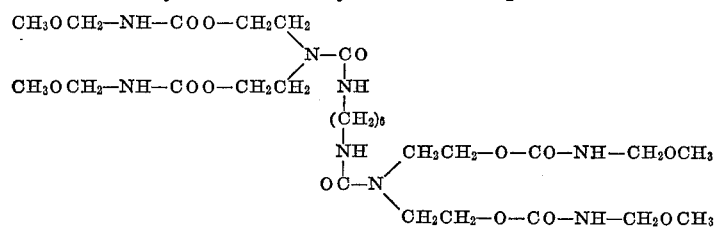

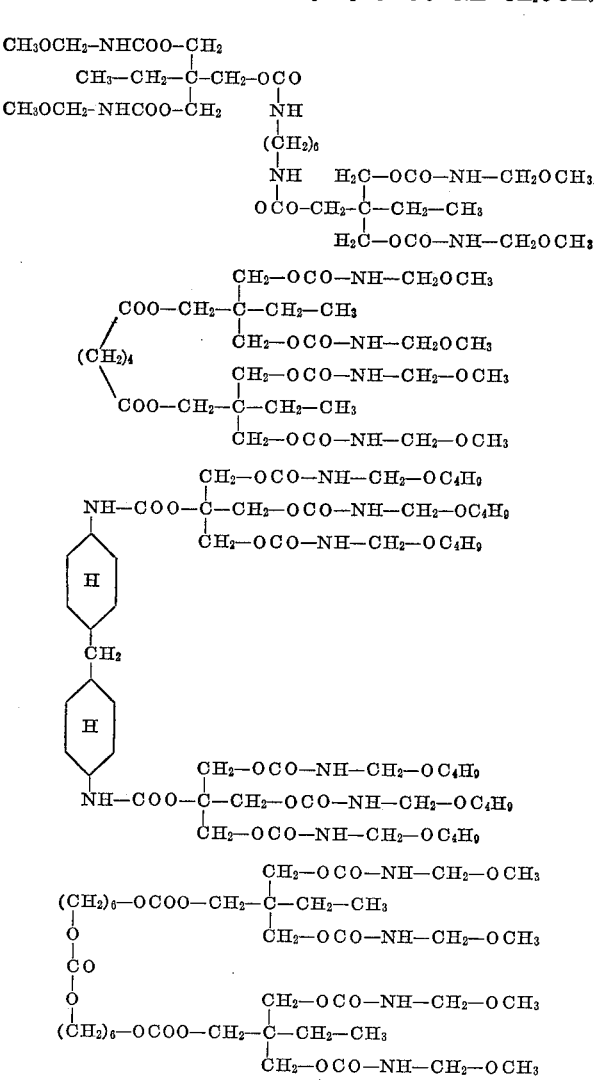

The large number of readily available poly-N-alkoxymethylurethanes now makes it possible for one skilled in the art to vary the properties of the polyacrylate films according to commercial requirements. The addition of melamine/formaldehyde or urea/formaldehyde resins is also contemplated but is not essential. Poly-N-alkoxymethylurethanes react with carbonamide-containing polyacrylates at elevated temperatures of from about 150° to about 250° C. to form insoluble films. If one wishes to stove at lower temperatures, it is advisable to add a catalytic amount such as from about 0.01 to about 6% by weight of a catalytically active acid or mixture of acids, the most effective of which include p-toluenesulphonic acid, phosphoric acid, maleic acid and the like. With the addition of 1% phosphoric acid, for example, a sufficiently rapid cross-linking reaction is obtained at 140° C. In this regard, even those acids which have been polymerized into the corresponding polyacrylate such as acrylonitrile, methacrylic acid, maleic acid semiester and the like may have a sufficiently powerful catalytic effect. The lacquer compositions are stable for several months at room temperature even when acid has been added.

The preparation of lacquers using poly-N-alkoxymethylurethanes as cross-linking components may be carried out in a known manner such as, for example, by dissolving or diluting the individual components in suitable solvents or diluents, grinding them up with pigments and adding catalysts and other auxiliary agents. The cross-linking agents of this invention may also be added to the polyacrylate after the pigment has been incorporated without affecting the properties of the resulting films. They are, of course, equally effective when used in the production of clear lacquers.

Any suitable solvents or diluents may be used including aromatic hydrocarbons such as toluene, xylene, chlorobenzene and the like; carboxylic acid esters such as ethyl acetate, butyl acetate, b-methoxyethyl acetate and the like; ketones such as methylethyl ketone, methylisobutyl ketone, cyclohexanone and he like; alcohols such as ethanol, butanol, ethylene glycol, butylene glycol, ethylene glycol monobutyl ether, -monomethyl ether and -monoethyl ether and the like. One may also use mixtures of the above solvents.

Any suitable pigments may be added as conventional lacquer additives including inorganic oxides such as titanium oxide, chromium oxide, iron oxides, zinc oxide, mixed oxides of cobalt, nickel and manganese and the like; selenides and sulphides such as zinc sulphide and cadmium sulphide and the like; chromates such as zinc chromate, lead chromate, strontium chromate and the like; organic pigments such as phthalocyanine dyes and the like, and mixtures thereof. The pigments may be blended in the usual way with fillers such as silicic acid, silicates, calcium sulphate, barium sulphate, aluminium oxide and the like. The lacquers may contain aluminium bronze and zinc dust to achieve anticorrosive and decorative effects. Other conventional lacquer additives which may be added include such auxiliary agents as alkyd resins and plasticizers which are of the adipate and phthalate types, as well as levelling agents such as cellulose acetobutyrate and the like and fillers may also be used.

The composition of the lacquer mixture depends on the functionality of the poly-N-alkoxymethylurethane, i.e. the amount of —NH—CH$_2$—OR groups present per molecule, and on the reactivity of the carbonamide-containing polyacrylate. The optimum composition can easily be determined by preliminary trial and by testing the hardness and solvent resistance of films or different compositions.

The lacquer mixtures of this invention have many uses. Due to their high strength, elasticity and resistance to chemicals and to weathering, they are suitable for application to implements and tools, for coating the insides of tins, for use as motor car lacquers and as luminous paint lacquers. They may be used in the production of chemically resistant protective coatings and for coating metallic tape. Metal sheets coated with the lacquer mixtures of this invention can be shaped and folded.

The invention is further illustrated but is not intended to be limited by the following examples in which all parts and percentages are by weight unless otherwise specified.

EXAMPLE 1

(A) Preparation of the carbonamide-containing polymer

About 6 parts of dodecyl mercaptan and about 20 parts of di-tert.-butylperoxide are introduced dropwise in the course of about 4 hours with stirring and under a nitrogen atmosphere into a mixture of about 240 parts of xylene, about 240 parts of n-butanol, about 150 parts of styrene, about 270 parts of ethyl acrylate, about 90 parts of acrylamide and about 90 parts of 2-ethyl-hexyl acrylate which has been heated to the reflux temperature. A further about 10 parts of di-tert.-butylperoxide are then added in one addition and the reaction mixture is again stirred for 4 hours. The polymer solution has a solids content of 54%.

(B) Preparation of a cross-linking agent for (A), composed of two components (a) and (b) which are mixed in a ratio of 3:1

(a) About 268 parts of trimethylol propane are melted, and about 148 parts of methoxymethylisocyanate are added dropwise with stirring at about 70° C. The reaction is finished after about 30 minutes. About 168 parts of 1,6-hexamethylene diisocyanate are now added dropwise and the mixture is then stirred for one hour at about 100° C. No free NCO groups remain after that time. The reaction mixture is diluted with about 392 parts of n-butanol and about 392 parts of xylene so that a 50% solution is obtained.

(b) About 180 parts of butane-1,3-diol are reacted at about 100° C. with about 168 parts of 1,6-hexamethylene diisocyanate and the reaction mixture is then left to cool to about 70° C. after which about 174 parts of methoxymethylisocyanate are added dropwise. The reaction mixture is stirred for 3 to 4 hours at about 70° C. The reaction is then complete. The substance is dissolved in xylene/butanol 1:1 to make a 50% solution.

(C) Lacquer mixtures according to the invention

A lacquer solution is obtained by mixing (A) and (B) in the ratio of 10:4. After the addition of 2% of maleic acid, based on the solids content of the solution, the solution is poured onto degreased steel sheets 0.5 mm. in thickness, left in air for a short while and then stoved in a circulating air oven for 30 minutes at 120°, 140° and 160° C. The films obtained are clear with a high gloss; they have good resistance to solvents and are firmly bonded. They can withstand sudden bending over a sharp edge at 180° C. without showing any signs of cracking or splintering off. The storage stability of the solution is also good. The viscosity of the lacquer does not increase after storage for 24 hours at 60° C.

In order to further investigate the properties of lacquers obtained from the above components, a grinding apparatus is used to triturate the mixture of solutions (A) and (B) with titanium dioxide of the rutile type in the proportion by weight of 1:1, based on the solids content, after 2% of maleic acid has been added to it. The triturated mixture is then diluted with xylene to adjust it to a spraying viscosity of from about 20 to about 26 seconds in a DIN-4 beaker. The coatings obtained by spraying this lacquer mixture onto steel sheets 0.5 mm. in thickness are stored for a short time to evaporate off the solvent and are then stoved in a circulating air oven for 30 minutes at 120°, 140° and 160° C.

After cooling, pure white, single-layer lacquer films are obtained which have a high gloss, are free from structural features and have good solvent resistance. When the films are exposed to the action of lacquer solvents such as aromatic hydrocarbons, esters and ketones, only slight, reversible swelling can be observed after a few minutes.

Other characteristics are summarized in Table 1.

TABLE 1

|  | Stoving temperature, 30 minutes | | |
| --- | --- | --- | --- |
|  | 120° C. | 140° C. | 160° C |
| Layer thickness, μ | 45–50 | 45–50 | 45–50 |
| Grid section DIN 53151 | 1 | 1 | 1 |
| Pencil hardness DIN 46453 | 2H | 2H | 2H |
| Erichsen cupping (mm.) DIN 53 156 | 7.0 | 7.5 | 8.0 |
| Bending test (sharp edge, sudden), ° C | 180 | 180 | 180 |
| Impact elasticity according to Gardner (inch/pound) | 8 | 8 | 8 |

NOTE: + in this case and in all the following examples denotes a faultless coating; − a faulty coating.

EXAMPLE 2

(A) Preparation of the carbonamide-containing polymer

About 300 parts of a mixture of about 240 parts of xylene, about 240 parts of n-butanol, about 200 parts of methyl acrylate, about 160 parts of butyl acrylate, about 150 parts of styrene, about 90 parts of acrylamide, about 12 parts of dodecyl mercaptan and about 12 parts of azodiisobutyronitrile are heated to about 90° C. under an atmosphere of nitrogen and when polymerization has started, the remainder of the solution is added dropwise in the course of 6 hours. The reaction mixture is then stirred for another 5 hours at 90° C. The solids content of the solution is 54.2%.

(B) Preparation of the cross-linking agent for (A)

About 402 parts of trimethylol propane, about 856 parts of diphenyl carbonate and about 236 parts of hexane-1,6-diol are mixed together in a three-necked flask and heated to about 130° C. A clear melt is formed, and the pressure is reduced to 12 mm. Hg. Phenol starts to split off after about 30 minutes and distills over a column at 75 to 80° C. The temperature is slowly raised to 180° C. for 8 hours. The temperature is then kept at 180° C. and the pressure is kept at 15 mm. Hg for 1 hour. The calculated quantity of phenol has then distilled off. A branched polycarbonate having an OH number of 365 is obtained in a quantitative yield in the form of a pale yellow oil.

About 100 parts of this product are then reacted with about 50 parts of methoxymethyl isocyanate at 70° C. and then dissolved in a 9:1 mixture of xylene and butanol to form a 50% solution (cross-linking agent $B_2$).

(C) Lacquer mixture according to the invention

The two solutions (A) and (B) are mixed together in the ratio of 10:9 and, as in Example 1, triturated with 100% titanium dioxide after the addition of 2% maleic acid. The triturated mixture is then diluted with xylene to adjust it to a spraying viscosity and sprayed on cleaned steel sheets which are then heated in a circulating air oven for about 30 minutes. The properties of the resulting lacquer films are summarized in Table 2. In addition, the results obtained when the polymer described under (A) is stoved with a commercial melamine resin obtained from hexamethylol melamine are given for comparison. The amount of melamine resin added is based on the solids content of solution (A) and is 15%. It could be confirmed by preliminary tests that a higher or lower melamine resin content gave even worse results.

In addition, Table 2 contains data on resistance to washing liquor. For this test, the resistance of a lacquer coat to boiling detergent is tested, using several of the detergents on the market, and the test results obtained with the strongest of these detergents are entered in the table.

Table 2 shows that the combination with melamine resin is substantially inferior in its elasticity, resistance to chemicals and resistance to solvents.

TABLE 2

|  | Mixture of solutions (A) and (B) in the ratio of 10:9 | | | Comparison.—Mixture of solution (A) with a 70% solution of a hexamethylol melamine in the ratio of 100:15 (calculated on solid to solid) | | |
| --- | --- | --- | --- | --- | --- | --- |
|  | Stoving temperature (30 minutes) | | | | | |
|  | 120° C. | 140° C. | 160° C. | 120° C. | 140° C. | 160° C. |
| Average layer thickness in μ | 35 | 40 | 40 | 50 | 45 | 45 |
| Grid section DIN 53151 | 1 | 1 | 1 | 1 | 1 | 1 |
| Pencil hardness DIN 46453 | 2H | 4H | 4H | 3H | 4H | 4H |
| Erichsen cupping (mm.) DIN 53156 | 10.2 | 7.7 | 6.1 | 3.8 | 3.9 | 3.4 |
| Bending test (sharp edge, sudden) | 180+ | 180+ | 180+ | 45− | 45− | 45− |
| Impact elasticity (inch/pound) according to Gardner | 4+ | 16+ | 14+ | 4+ | 4+ | 4+ |
| Resistance to washing liquor at boiling temperature | (1) | (1) | (1) | (2) | (2) | (2) |
| Resistance to solvents, 5 minutes action (ethyl acetate) | (3) | (4) | (4) | (5) | (6) | (6) |

1 Small bubbles appear after 16 hours, gloss constant.
2 Completely destroyed after 3 hours.
3 Slightly swollen.
4 Unchanged.
5 Swollen, lifted from the metal sheet.
6 Badly swollen.

EXAMPLE 3

(A) Preparation of the carbonamide-containing polymer

About 300 parts of a mixture of about 720 parts of xylene, about 720 parts of n-butanol, about 630 parts of styrene, about 400 parts of methyl acrylate, about 300 parts of butyl acrylate, about 200 parts of vinyl acetate, about 270 parts of acrylamide, about 15 parts of dodecyl mercaptan and about 36 parts of azodiisobutyric acid dinitrile are heated under an atmosphere of nitrogen to form about 85° to about 90° C. and the remainder of the monomer mixture is added dropwise at from about 85° to about 90° C. in the course of 5 hours with stirring. About 5 parts of azodiisobutyric acid dinitrile are then added and the reaction mixture is stirred for another 4 hours at the same temperature. The polymer solution has a solids content of 54%.

(B) Preparation of the cross-linking agent for (A)

The procedure described in Example 2 part (B) is employed to prepare a branched polycarbonate having an OH number of about 359 from about 236 parts of hexane-1,6-diol, about 268 parts of trimethylol propane and about 642 parts of diphenyl carbonate. About 100 parts of the highly viscous oil are reacted with about 50 parts of methoxymethyl isocyanate. Cross-linking agent $B_3$ is obtained by dissolving the reaction mixture in about 150 parts of xylene.

(C) Lacquer mixture according to the invention

The solutions obtained under (A) and (B) are mixed in a ratio of 1:1 and 2% of maleic acid or phosphoric acid, calculated as solid based on the solids content of the solutions, are added. Castings which are stoved at 120° C. and 140° C. are clear and have a good gloss.

The mixtures are then pigmented with titanium dioxide of the rutile type and triturated. The intensity of pigmentation is 100% based on the amount of solid resin in each case. After the mixtures have been diluted to spray viscosity, they are sprayed onto degreased steel sheets 0.5 mm. in thickness and stoved at the temperatures indicated in Table 3. In addition, the resistance to boiling detergent solution is also measured to determine the resistance to chemicals. In this case, metal sheets treated with zinc phosphate as corrosion protection or a two-component wash primer based on polyvinylbutyral/phosphoric acid/zinc chromate is used.

thickness and then stoved. About 2% of phosphoric acid, based on the solids content, is added before trituration with the pigment.

The metal sheets which are used for testing the resistance to washing liquor are sprayed in two layers. They are pretreated as described in Example 3. The results are given in Table 4.

TABLE 4.—LACQUER FILMS WITH 2% PHOSPHORIC ACID

|  | Stoving temperature (30 minutes) | | |
| --- | --- | --- | --- |
|  | 120° C. | 140° C. | 160° C. |
| Average layer thickness in μ | 35-40 | 35-40 | 35-40 |
| Grid section DIN 53151 | 2 | 1 | 1 |
| Pencil hardness DIN 46453 | 5H | 5H | 5H |
| Impact elasticity according to Gardner (inch/pound) | 12 | 6 | 4 |
| Resistance to washing liquor at boiling temperature | (1) | (1) | (1) |
| Resistance to solvents, 5 minutes' action (toluene/ethyl acetate) | (2) | (2) | (2) |

[1] Unchanged up to 40 hours, no impairment of gloss, no loss in bond strength.  [2] Unchanged.

A comparative test showed that the properties of a lacquer of copolymer (A) in combination with melamine resins, are completely unsuitable for commercial purposes, as regards elasticity, bond strength and resistance to chemicals and solvents.

TABLE 3

|  | 2% maleic acid | | | 2% phosphoric acid | | |
| --- | --- | --- | --- | --- | --- | --- |
|  | Stoving temperature (30 minutes) | | | | | |
|  | 120° C. | 140° C. | 160° C. | 120° C. | 140° C. | 160° C. |
| Average layer thickness in μ | 30 | 30 | 30 | 30 | 35 | 30 |
| Grid section DIN 53151 | 1 | 1 | 1 | 1 | 1 | 1 |
| Pencil hardness DIN 46453 | 2H | 4H | 4H | 2H | 4H | 4H |
| Erichsen cupping (mm.) DIN 53156 | 9.7 | 7.9 | 7.5 | 10.6 | 6.9 | 7.5 |
| Bending test (sharp edge, sudden), degrees | 180+ | 180+ | 180+ | 90− | 180+ | 180+ |
| Impact elasticity according to Gardner (inch/pound) | 6 | 16 | 16 | 4 | 24 | 20 |
| Resistance to washing liquor at boiling temperature | (1) | (2) | (3) | (1) | (4) | (5) |

[1] Not tested.  [2] Bubbles after 8 hrs.  [3] Bubbles after 24 hrs.  [4] Bubbles after 16 hrs.  [5] Small bubbles after 24 hrs., unchanged after 40 hrs.

EXAMPLE 4

(A) Preparation of the carbonamide-containing polyacrylate

A solution is prepared from about 300 parts of styrene, about 10 parts of acrylic acid, about 90 parts of acrylic acid amide, about 200 parts of butyl acrylate and about 12 parts of azodiisobutyric acid dinitrile in about 330 parts of a solvent mixture of xylene and n-butanol (1:1) and heated to about 45° C. before being added dropwise under an atmosphere of nitrogen and with stirring to about 150 parts of a solvent mixture (xylene/butanol 1:1) heated to about 85° C. in the course of about 7 hours. The last 50 parts of the monomer mixture are mixed with one part of the azodiisobutyric acid dinitrile and added dropwise in the course of one hour. At the end of the addition, the solids content is 53.5%.

(B) Preparation of a poly-N-methoxymethyl urethane cross-linking agent

A polyester having an OH number of 400 and acid number of 15 is prepared in known manner from about 270 parts of trimethylol propane, about 92 parts of ethanediol and about 300 parts of phthalic acid anhydride. About 50 parts of xylene are added to about 100 parts of this substance and the mixture is heated to 70° C. and reacted with about 60 parts of methoxymethyl isocyanate. The mixture is thoroughly stirred during the reaction. No free NCO groups remain after about 4 hours. A 50% solution in xylene/butanol (3:1) is now prepared by the addition of xylene and butanol (cross-linking agent B₄).

(C) Lacquer mixture according to the invention

About 2 parts of copolymer (A) are mixed with about 1 part of cross-linking agent B₄ and pigmented with a titanium dioxide of the rutile type at a concentration of 100% based on the resin solids. This mixture is triturated in a conventional apparatus, diluted to spray viscosity with xylene, sprayed on degreased steel sheets 0.5 mm. in

EXAMPLE 5

(A) Preparation of carbonamide-containing polyacrylate copolymer

A mixture of about 240 parts of xylene, about 240 parts of n-butanol, about 300 parts of styrene, about 30 parts of methacrylic acid, about 90 parts of methacrylamide, about 180 parts of butyl acrylate and about 12 parts of azodiisobutyric acid dinitrile is prepared at an elevated temperature (45° C.), and about 150 parts of this mixture are introduced into a reactor equipped with heating jacket under an atmosphere of pure nitrogen. The mixture is heated to about 85° C. with stirring and the remainder of the mixture is added dropwise at about 85° C. in the course of 5½ hours. About 1 part of azodiisobutyric acid nitrile is then added to the lacquer solution and the solution is heated for a further 1 hour at 85° C. The solution then has a solids content of 52%.

(B)

Poly-N-methoxymethylurethane (cross-linking agent B₄) described in Example 4 is used as cross-linking agent for the copolymer described under (A).

(C) Lacquer mixture according to the invention

Copolymer solution (A) and solution of cross-linking agent B₄ are mixed in the ratio of 1:1 and about 3% of phosphoric acid, based on the solids content of the solution, are added. The solution is pigmented with 100% titanium dioxide of the rutile type and triturated in the usual manner. After dilution to spray visoosity, the lacquer is sprayed on degreased steel sheets 0.5 mm. in thickness, and stoved at the temperatures indicated in Table 5 for about 30 minutes. The properties of the lacquer are shown in Table 5.

TABLE 5

| | Stoving temperature (30 minutes) | | |
| --- | --- | --- | --- |
| | 120° C. | 140° C. | 160° C. |
| Average layer thickness in μ | 40–45 | 40–45 | 40–45 |
| Grid section DIN 53151 | 2 | 1 | 1 |
| Pencil hardness DIN 46453 | 5H | 6H | 6H |
| Impact elasticity according to Gardner (inch/pound) | 12 | 10 | 10 |
| Resistance to washing liquor at boiling temperature | (1) | (1) | (1) |
| Resistance to solvents after 5 minutes' action (toluene/ethyl acetate) | (2) | (2) | (2) |

[1] Unchanged after 40 hours, no impairment of gloss, no loss in bond strength.  [2] Unchanged.

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:

1. Lacquer mixtures which contain from about 15 to about 50 parts by weight of at least one hydroxyl free poylacrylate resin having sufficient carbonamide groups to promote cross-linking and a molecular weight greater than about 600 and from about 5 to about 40 parts by weight of a poly(N-alkoxymethylurethane) which is the reaction product of a polyhydroxyl compound and an alkoxymethyl isocyanate of the formula

ROCH$_2$—NCO wherein R is an alkyl or alkylene radical having 1 to 12 carbon atoms, and from about 20 to about 80 parts by weight of a solvent.

2. The lacquer mixtures of claim 1 wherein the poly(N-alkoxymethylurethane) is a compound having a molecular weight of above 600 and containing at least 3 alkoxymethylurethane groups.

3. The lacquer mixtures of claim 1 wherein the poly(N-alkoxymethylurethane) is a compound having a molecular weight of above 600 and containing at least 4 alkoxymethylurethane groups.

4. The lacquer mixtures of claim 1 containing at least one melamine/formaldehyde resin.

5. The lacquer mixtures of claim 1 containing at least one urea/formaldehyde resin.

6. The lacquer mixtures of claim 1 wherein up to 70 percent of the poly(N-alkoxymethylurethane) is replaced by a melamine/formaldehyde resin or a urea/formaldehyde resin.

References Cited

UNITED STATES PATENTS

| 2,653,140 | 9/1953 | Allenby et al. | 260—851 |
| 3,094,371 | 6/1963 | Van Loo et al. | 260—851 |
| 3,220,869 | 11/1965 | Ruemens et al. | 260—851 |
| 3,342,893 | 9/1967 | Emmons et al. | 260—851 |
| 3,415,768 | 12/1968 | Dieterich et al. | 260—77.5AT |

JOHN C. BLEUTGE, Primary Examiner

U.S. Cl. X.R.

117—132, 161; 260—32.8, 33.2, 33.4, 33.6, 39, 41, 75, 77.5, 849, 851, 856